Oct. 20, 1942.  G. A. BELL  2,299,452
FUEL INJECTOR FOR INTERNAL COMBUSTION ENGINES
Filed Aug. 4, 1939
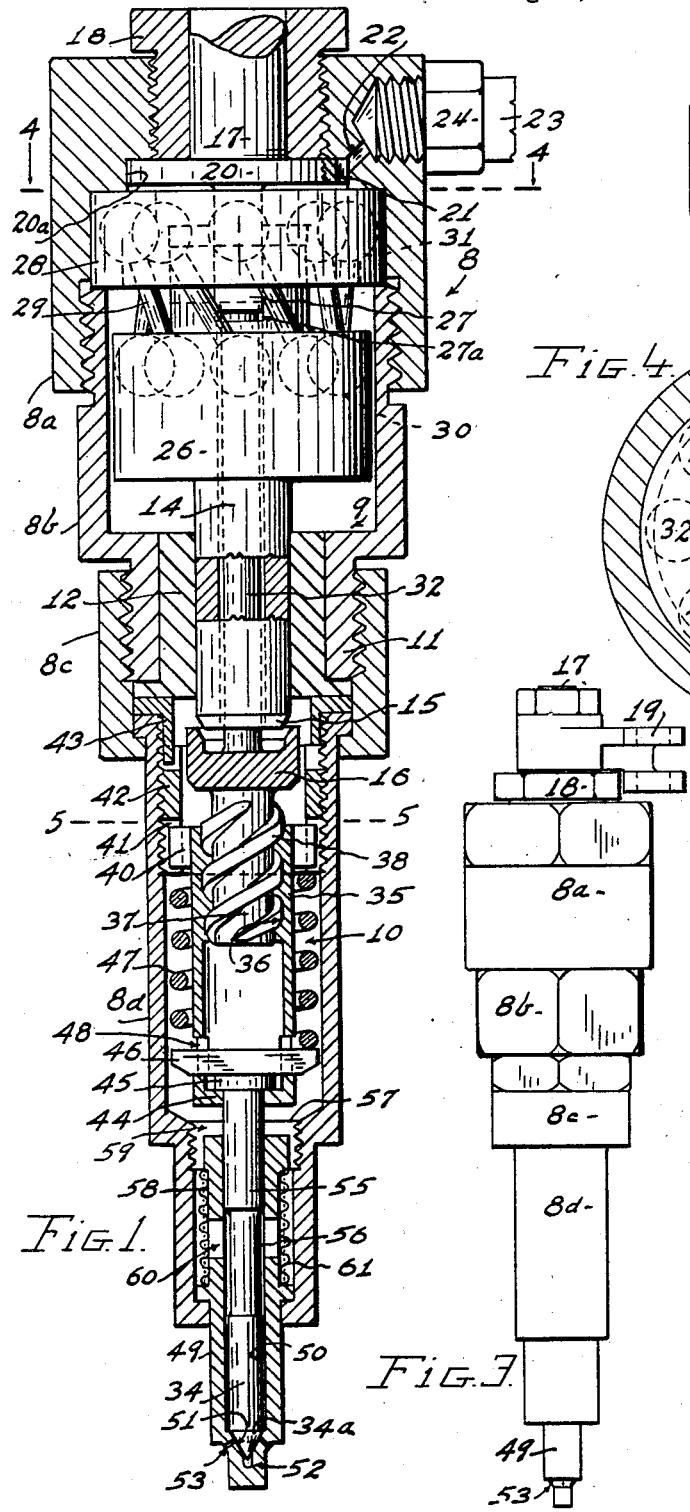
Fig. 1.
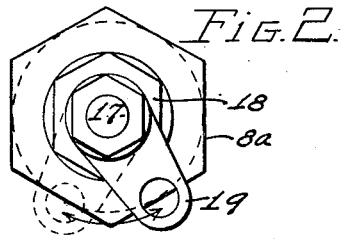
Fig. 2.
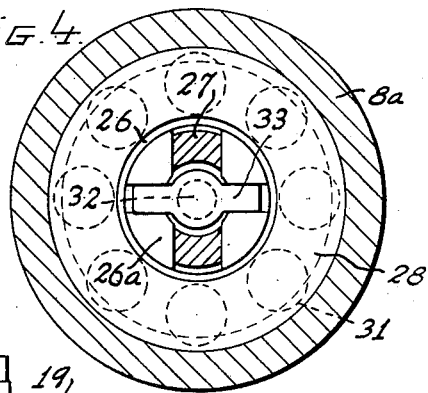
Fig. 4.
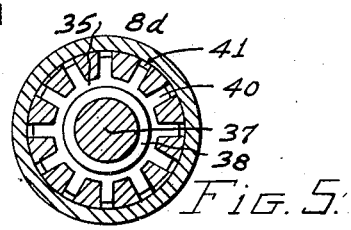
Fig. 3.
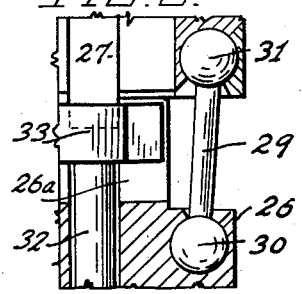
Fig. 5.
Fig. 6.
INVENTOR.
Guy A. Bell Patented Oct. 20, 1942

2,299,452

UNITED STATES PATENT OFFICE 2,299,452

FUEL INJECTOR FOR INTERNAL COMBUSTION ENGINES

Guy A. Bell, Glendale, Calif.

Application August 4, 1939, Serial No. 288,377

4 Claims. (Cl. 299—107.2)

My invention has to do with fuel injectors for internal combustion engines, and more particularly the solid injection of fuel for Diesel engines.

A particular object of the invention is to provide such control over rate and period of injection, and such minute subdivision of the fuel as to provide for burning fuel so efficiently and at such time as to more closely approach ideal conditions. Specifically it is an object of the invention to provide for both beginning and terminating injection while a body of fuel in the injector is under suitably high pressure so that the entire charge of fuel passes thru highly restricted orifices at velocities productive of very thorough atomization.

Another object of the invention is that while a body of fuel is under an extremely high degree of compression immediately behind the injection orifices, these orifices shall open gradually until injection is accomplished and shall close or be cut off quite suddenly, all while the fuel body is under continued high pressure so that the rate of injection is practically proportional to the opening while the velocity of fuel passing the atomizing orifices is at all times so high as to insure proper atomization.

While it is known that a degree of atomization can be reached where combustion is too rapid or where detonation will be pronounced, it is an object of this invention to provide for employing extremely fine subdivision of the fuel while injecting the fuel in a manner that a localized flame is first started and then an increasing amount of fuel is injected into or thru this localized flame.

This invention is in part in the nature of an improvement over the invention set forth in my Patent No. 1,943,718, issued January 16, 1934, and it is an object of this invention to provide for employing certain features of the aforesaid invention at the relatively high rotative speeds required in airplane power plants, where light weight and efficiency are particularly important.

In the device described in the aforesaid patent the injector valve is lifted by and released by pressure responsive means whereas it is an object of this invention to provide a combination of pressure responsive and mechanical means for both unseating and seating the injector valve so that while injection only under favorable fuel pressures is assured the present invention provides more positive cut-off of injection so that the last portion of fuel to be injected passes the injection orifices at high velocity and under proper atomizing conditions.

Another object of the invention is to provide a compact injection unit embodying a high pressure injection plunger and means for controlling seating and unseating of the needle valve or injection valve, in which unit the plunger and its inlet valve serve the added purpose of lifting the needle valve as well as insuring return of the needle valve to its seat at the rate required under conditions of high rotative speed.

Still another object of the invention is to provide a more effective combination of needle valve and atomizing orifices which discourages the injection of any solid core of improperly atomized fuel.

Another object of the invention has to do with uniform amounts of injection to insure a well balanced multi-cylinder engine, and to compensate for any wear in co-operative pumping surfaces. In the usual injection pump slight changes in effective displacement due to wear or due to changing viscosity of fuel under changing temperature conditions may result in unbalanced operation and it is an object of this invention to provide that fuel slipping by the plunger from the high pressure end to the low pressure end will be trapped and re-pumped so that despite reasonable wear, and usual changes of viscosity my improved injector will invariably deliver under high atomizing pressure all fuel which is metered to it thru the engine throttle. Expressed in other terms, it is an object of this invention to provide so that as wear or viscosity changes tend to increase slippage the pump plunger will invariably promote high pressure injection of the allotted fuel even should all fuel be required to be handled more than once by the plunger.

Still other objects and advantages of my invention will appear hereinafter.

I have illustrated by the accompanying drawings one practical embodiment of my invention, particularly one suited to either a single cylinder or multiple cylinder engine of the high speed light-weight type where rapid and efficient combustion is required without momentarily subjecting the engine to pressures above those for which the engine is designed, and in the case of the full Diesel cycle, above the usual compression pressure.

Figure 1 of the drawing is a view partly in elevation and partly in vertical section, of the said embodiment, this view being greatly enlarged to show details.

Figures 2 and 3 are plan and elevation respectively of the embodiment, these being about full size.

Figures 4 and 5 respectively are detail cross sections seen on lines 4—4 and 5—5 respectively of Figure 1.

Figure 6 is a fragmentary vertical section of the mechanism for imparting the peculiar spiral motion to the plunger.

In carrying out my invention I provide respectively, a high pressure chamber, a low pressure chamber and a valve controlled plunger reciprocating in a wall between the two plungers. As the plunger moves inwardly of the high pressure chamber it first compresses the existing body of fuel partly by reason of the slight compressibility of fuel and partly by reason of the accumulator effect of the walls of the chamber. When, and only when, this pressure has increased suitably, some of this fluid is allowed to escape thru carefully controlled injection orifices to produce the required injection. During injection the plunger continues to move inwardly of the high pressure chamber to maintain a high pressure during injection, and then when injection is at its maximum the injection orifices are suddenly closed and preferably by mechanical means particularly when the engine speed is high. During this injection period any fuel which slips by the plunger goes back into the low pressure chamber to "supercharge" same for the next plunger stroke for I provide that such slippage will not reduce the allotted amount of fuel supplied to the low pressure chamber as determined by the engine throttle. Thus the plunger may actually pump more fuel than it ejects and its stroke is always more than sufficient to handle injection, and the amount of injection is controlled by factors other than the plunger displacement.

When injection is complete and the injection valve or needle valve is moving to its seat, or when it is seated, pressure in the high pressure chamber is momentarily relieved so as to prevent any minute sweating of fuel films thru the orifices after injection period and which are known to build up a cone of carbon around the orifices to eventually disturb atomization.

By lifting the needle valve only after a high injection pressure is built up and by lifting the valve gradually, it appears that I first created in the engine cylinder a small localized combustion zone which I term a "starting flame." Then into or thru this starting flame the remainder of the fuel is injected at an ever increasing rate until just as this rate is maximum the injection is cut-off by substantially simultaneous closing the needle valve and lowering of the pressure in the high pressure chamber. I provide very sensitive adjustments for predetermining both the seating period of the needle valve and the period for releasing pressure of the high pressure chamber and when these adjustments are made for any given engine it is difficult to explain the exact relationship between valve closing and pressure reduction and one may be retarded with respect to the other, hence the term "substantially simultaneously." However, it is a peculiarity of my injector that it is usually adjusted so that the plunger continues to move inwardly of the high pressure chamber even after seating of the needle and release of pressure is effected so that there is no danger of the injection pressure dropping to a mere dribble, such as has been the bane of Diesel engineers.

The numeral 8 generally indicates the injector body providing the upper low pressure chamber 9 and the lower high pressure chamber 10. These are separated by a wall 11 and in this wall 11 is fitted a renewable bushing 12. The plunger is indicated at 14 as being a working fit in said bushing and reciprocable in the bushing between the two chambers. This plunger is tubular to provide communication between the two chambers and its lower end terminates in a valve seat 15 within the high pressure chamber 10. In the high pressure chamber 10 is what may be termed a floating valve disc 16 disposed to be abutted by the plunger seat 15 during inward movement thereof so as to close communication between the chambers and whereby pressure in said high pressure chamber 10 will hold the disc seated on seat 15 during downward compressing and displacing movement of said plunger.

An oscillating shaft 17 is provided passing out of the low pressure chamber axially of the body thru a packing gland 18, the latter being of any suitable type and not shown in detail. By any well known means this shaft is oscillated so that its arm 19 describes the path shown by the superimposed arrow. Of course the timing and speed of oscillation is important but is within the skill of those familiar with the art. It is preferable however that the shaft and my means for oscillating it be co-ordinated so that plunger 14 completes its inward movement relative to high pressure chamber 10 only after injection has been completed and that the plunger be traveling at appreciable speed thruout the full injection period, and of course that the injection period be suitably short.

This shaft 17 terminates in a disc 20 which is a suitably close fit in a corresponding margin 20ᵃ of the body; the margin 20ᵃ and the disc 20 being provided with complementary ports 21 and 22 respectively arranged to register at least once during each oscillation of the shaft 17 and preferably at a time prior to or after injection. To the body at port 22 is connected a low pressure fuel line 23 fitted with a non-return valve 24. It will be understood that any usual fuel metering means (not shown) may be provided for feeding measured amounts of fuel to line 23 so that each time that ports 21 and 22 register this measured amount of fuel will be forced into the low pressure chamber and that the speed or power of the engine served by the injector will be controlled by the rate or pressure at which fuel is fed thru line 23 and the registering ports 21 and 22. These ports serve as a low pressure cut-off so that even should fuel be fed thru line 23 at a pressure above maximum cylinder pressure, the movement of plunger 14 outwardly of the low pressure chamber will cause the low pressure chamber (when ports 21 and 22 are out of registration) to drop below engine pressure. These registering ports may be used as part of a complete distributor and throttle system.

Actually the plunger 14 with valve 16 is an injection pump and not a device for keeping the high pressure chamber invariably charged at high pressure. The plunger at the end fitted in the low pressure chamber is provided with an annular enlargement or collar 26, and a two-piece spline 27 is provided to connect the plunger and the oscillating shaft 17 so that as the plunger oscillates or turns with the shaft 17 it is free to reciprocate accordingly. Altho any cam means may be used for imparting combined turning and axial movement to the plunger I provide a fixed collar 28 in the low pressure chamber. This collar 28 and the collar 26 are interconnected by a circumferential arrangement of links 29, 29.

etc.; each link having one end pivoted as at 30 in the plunger collar and each having its other end pivoted as at 31 in a fixed collar 28.

When the plunger is in uppermost position as shown in Figure 1, these links are appreciably inclined. As the shaft 17 oscillates and oscillates the plunger, the plunger will first descend at a rate coordinate with the decrement of the cosine of the angle of inclination of the links and the speed of plunger descent will decrease relative to rotative or turning speed. Thus the plunger is given a spiral motion, the helical pitch of which is maximum at the beginning of the inward stroke and minimum at the end of inward stroke toward the high pressure chamber.

The valve disc 16 has an extension 32 which passes loosely thru the bore of the tubular plunger so that fuel can be pumped between the existing clearance. In the injector being described the amount of fuel displaced is relatively small and it is not possible in the drawing to show the clearance in true scale. This also applies to other parts hereinafter described and therefore the description rather than the drawing is to be relied on to explain fluid flow. Extension 32 is provided with a spline 33 which causes it and the plunger to turn co-ordinately but the valve disc 16 and its extension 32 are free to travel axially of the body independently of the plunger at times.

The needle valve is indicated at 34 and is fitted with an upper extension 35 which is internally threaded as at 36. The valve disc 16 is provided with a second integral extension 37 at the lower end and this is screw threaded as at 38 to thread into the extension 35 of the needle valve; this latter extension of the needle valve being hereinafter known as the valve lift.

It is a peculiarity of this injector that the helical pitch of the threads 36 and 38, which are of course constant in helical pitch, is intermediate of maximum and minimum pitches respectively of the path of travel of the plunger as determined by links 29, 29.

The valve lift is provided with radial teeth 40 cooperating with slots 41 provided in the wall of the injector body. These slots and teeth prevent the needle valve life from turning except perhaps for a very small clearance between teeth 40 and slots 41 essential to smooth operation of parts and to prevent seizing, but practically speaking, the degree to which the needle valve lift can rotate is decidedly limited although nevertheless definite. The slots also limit upward movement of the lift and form a very important function in so doing.

For purposes of close final adjustment these slots are provided in a sleeve 42 screw threaded into the corresponding bore of the body and locked in adjusted position by a vernier lock 43.

The needle valve 34 is slightly telescopic with regard to the lift 35 or vice-versa. The lift and valve respectively are provided with co-operating shoulders 44 and 45 which while causing the needle to be lifted by the lift 35 permit of the lift being depressed slightly when the needle is seated. The needle is held seated by a bar 46 and a spring 47. The spring is compressed between bar 46 and sleeve 42 and bar 46 is thus held against the upper shoulder end 45 of the needle. To accommodate the bar 46 in this position the lift is accordingly slotted as at 48 the slot providing slight clearance for the bar axially of the lift. Thus when the lift is raised it pulls the needle up with it but is yieldably resisted by the spring 47. However when the needle is fully seated and the lift 35 is depressed below the position in which it is shown, then the spring is slightly compressed between teeth 40 and bar 46 and the lift 35 is allowed to descend, under resistance of spring 47, until the top limits of slots 48 strike the upper surface of bar 46.

The aforesaid respective helical pitches are so co-ordinated that when plunger 14 first begins to move down in a spiral motion it progresses toward the valve disc 16 faster than the valve disc progresses toward the lift or faster than the extension 37 screws down into the valve lift. As a consequence the seat end 15 of plunger 14 first "catches up to" the valve disc and same becomes seated on the end of the plunger. Now this descent of the plunger continues and acts thru the new seated disc 16 and the extension 37 thereof to slightly depress the valve lift but before the lift has been appreciably depressed the helical pitch of travel of the plunger will have decreased to where it is less than the helical pitch of the threads 36 and 38.

The result then is that the turning action of the plunger causes the threads 36 and 38 to cooperate to lift the needle notwithstanding the fact that the plunger is descending, although now at a slower rate than the needle is being lifted. Of course the extension 37 may screw down into the threads of the lift without lifting the needle valve, but by this time the inward motion of the plunger has built up such high pressure in the chamber 10 that the disc 16 is held to its seat with such force that the needle is lifted. However, if in the meantime no fuel has been fed to the injector thru line 23 then the supply in chamber 10 will become depleted to where the plunger will not be able to build up sufficient pressure to insure of the needle being lifted.

This injector therefor provides that the needle will lift only if and when pressure in chamber 10 is suitable for injection. The parts, by reason of conditions and adjustments might even allow the valve disc to break from its seat slightly whereupon the plunger in further descent might momentarily build up enough pressure to cause the valve disc 16 to be urged toward its seat just enough to slightly lift the needle. However according as fuel is delivered to the injector and must be ejected no matter how many times it might be recirculated by the plunger, so is the needle lifted, if ever so slightly, but it is never lifted unless pressure is above that predetermined upon for proper injection.

Now when the needle lifts the plunger continues to follow thru and continues to displace fluid to keep the pressure in chamber 10 suitably constant and high during injection. However should the pressure tend to reduce unduly before the needle is completely lifted, the tension of spring 47 will break the connection between disc and plunger and will seat the needle, and substantially simultaneously fluid in chamber 10 will back thru the tubular plunger to be conserved in the low pressure chamber for the next injection. This will relieve the pressure in chamber 10 after the needle valve is seated to prevent any final film of fuel from sweating thru the needle valve orifices. However, this automatic or pressure-responsive release of the needle lift is similar to that shown in said patent and is not relied upon in this case under conditions of extremely high operating speeds.

This invention provides that while the plunger is still moving inwardly of the high pressure chamber and thereby keeping up pressure therein, the teeth 40 of valve lift 37 strike the upper limits of slots 41 and break the seat between disc and plunger seat; the plunger at this time turning about its center but progressing inwardly of the chamber 10 less rapidly than the lift is raising. The resultant blow seems to have a rebound effect on the needle and lift, and this combined with the fact that high pressure is still forcing fuel by the needle valve, results in the needle being seated far more quickly and accurately than has been possible heretofore, and in fact the device appears to function as intended at rotative speeds of as high as 7,000 R. P. M. in a four cycle engine and appears to be ready to meet even higher speed conditions.

While I have described the adjustments and the operation in definite terms by way of explanation, it will be understood that the many possible adjustments may cause the device to operate somewhat differently than explained. Also it will be understood that the functions take place in split-thousands of a second and are difficult to analyze, but under any condition the lift and cut-off of the needle valve may be made positive and controlled so that injection takes place only at high pressure and yet this pressure is relieved at just the correct time to prevent the injector from sweating or leaking at other times. Also the mechanical cut-off for primary introduction of low pressure fluid to the low pressure chamber provides that at one interval the entire interior of the injector may be at an average pressure below that of engine pressure, if desired.

The injector is shown provided with a special tip 49 having a smooth bore 50 terminating in a conical depression or needle seat 51. This seat is slightly relieved at the very bottom as at 52 to prevent the needle point from touching and to insure the cone 34a of the needle seating co-extensively over all surfaces of the seat 51 and to provide that the two surfaces may be ground together. The seat 51 is perforated by suitably arranged extremely fine orifices 53. These are shown normal to the conical surface to provide a generally conical spray although I find in some engines these orifices are best drilled horizontally whereupon the orifices at the seat 51 are elliptic and provide a greater circumference of fuel-shearing surface.

The needle lift is extremely slight but since it is lifted by screw threads its lift is very accurate and provides for the increasing rate of injection peculiar to this invention.

The needle as at 55 near the upper end of the tip is a close working fit. Then below this point it is relieved as at 56. The tip is provided with an enlarged threaded shoulder 57 and is there screw-threaded into the injector body. This tip, where it is within the body is relieved as at 58 and the shoulder is slotted as at 59. Thus fuel tends to pass thru slot 59 and space 56 to enter the bore of the tip at the relieved portion of the needle by passing thru apertures 60. These are covered by a screen 61 to finally filter the fuel.

It appears that by having the needle a close fit at one point in the bore there is a hydraulic action which further tends to seat the needle quickly when it is released and while the plunger is still displacing fluid toward the orifices. However, by having the cone of the needle seat closely in a corresponding conical and perforated seat, cut-off is very definite and the needle does not have a piston effect such as would cause it to pump fluid thru orifices in order to seat, and this type of seating is an important adjunct to the feature of having the lifting valve strike a stop and rebound therefrom while the plunger is still moving inwardly of the high pressure chamber.

It will be seen that the steel body is made up of several parts which permit of easy access for inspection and adjustment but the parts are attached at points where seals are readily effected and the invention provides that high pressure is only momentary and the plunger and its inlet valve do not suffer from wear as in other devices, for the plunger displacement is far beyond that required for injection and considerable slip or leakage from one chamber to another will not alter efficiency or capacity of the injector and despite slippage past the plunger and valve the injector will deliver highly atomized fuel in uniform injections at the same rate as fluid is measured thru the registered ports 21 and 22 which control original introduction of fuel to the injector.

Numerous methods are known for producing the oscillating motion required for the plunger and attached parts and by providing for using oscillating motion a designer is enabled to carry out my invention by providing for the plunger any characteristic rate of inward travel at any portion of the plunger stroke without disturbing the important relationship between the helical pitch of the plunger and that of the valve lift.

I claim:

1. In a fuel injector a body providing a chamber, a wall dividing said chamber respectively into a high pressure chamber and low pressure chamber, an injector valve opening outwardly from said high pressure chamber, a tubular plunger reciprocable thru said wall and providing a valve seat at the end within said high pressure chamber, a valve disc in said high pressure chamber disposed to be abutted by the seat of said plunger when same is moving inwardly of said high pressure chamber to then travel inwardly with said plunger while sealing the said high pressure chamber from the low pressure chamber, means operable only after seating of said disc on said plunger to open said injector valve and means operating on continued inward movement of said plunger in said high pressure chamber to unseat said valve disc from said plunger and to move said injector valve to closed position.

2. In a fuel injector a body having a hollow interior and provided with spray orifices at the inner end leading from said interior, a wall to said body dividing the interior to provide a high pressure chamber at the inner end and a low pressure chamber at the outer end, a plunger reciprocable thru said wall and having a thru bore terminating in a co-axial valve seat at the end within said high pressure chamber, means for imparting a spiral motion to said plunger of decreasing helical pitch inwardly of said high pressure chamber, a valve disc in said high pressure chamber disposed to seat on the seated end of said plunger, a spline between said plunger and disc whereby they are independently movable axially and co-ordinately movable circumferentially, a needle valve at the inner end of said high pressure chamber seating on said orifices, a spring holding said needle valve yieldably seated over said orifices, a non-rotatable threaded valve lift connected to lift said needle by movement toward said plunger, and means for moving said lift toward said plunger, to lift said needle during movement of said plunger toward said lift comprising a correspondingly threaded extension to said valve disc screw threaded into said lift; the said screw threaded portions having a constant helical pitch less than the helical pitch of initial inward travel of said plunger relative to said high pressure chamber and greater than the helical pitch of final travel of said plunger inwardly of said high pressure chamber.

3. The injector as in claim 2 and in which said lift is yieldably movable toward said needle valve during the interval when the plunger acts to move the valve disc toward the needle more rapidly than the valve disc extension spirals into the said lift.

4. The injector as in claim 2 and further including means operating on predetermined lift of said needle during inward movement of said plunger in the high pressure chamber to unseat the disc from the plunger.

GUY A. BELL.